United States Patent [19]

Bauer et al.

[11] 3,999,536
[45] Dec. 28, 1976

[54] SOLAR ENERGY ABSORBER PLATE HAVING A BREATHER TUBE

[75] Inventors: William R. Bauer, Natrona Heights; Lester F. Schutrum, New Kensington, both of Pa.

[73] Assignee: PPG Industries, Inc., Pittsburgh, Pa.

[22] Filed: Mar. 19, 1975

[21] Appl. No.: 559,950

[52] U.S. Cl. .................................. 126/271; 52/172
[51] Int. Cl.² ........................................ F24J 3/02
[58] Field of Search .......... 126/270, 271; 237/1 A; 52/172

[56] References Cited
UNITED STATES PATENTS

| | | | |
|---|---|---|---|
| 1,250,260 | 12/1917 | Wilcox | 126/271 |
| 3,771,276 | 11/1973 | Stewart et al. | 52/172 |

FOREIGN PATENTS OR APPLICATIONS

| | | | |
|---|---|---|---|
| 938,012 | 9/1963 | United Kingdom | 126/271 |

Primary Examiner—Kenneth W. Sprague
Assistant Examiner—James C. Yeung
Attorney, Agent, or Firm—Donald Carl Lepiane

[57] ABSTRACT

A solar heat collector has a breather tube provided on the absorber plate to provide communication between the ambient air and air in the airspace of the collector through desiccant material. In this manner, the air pressure in the airspace is equalized to the ambient air pressure without moisture moving into the airspace and the desiccant material is regenerated.

23 Claims, 8 Drawing Figures

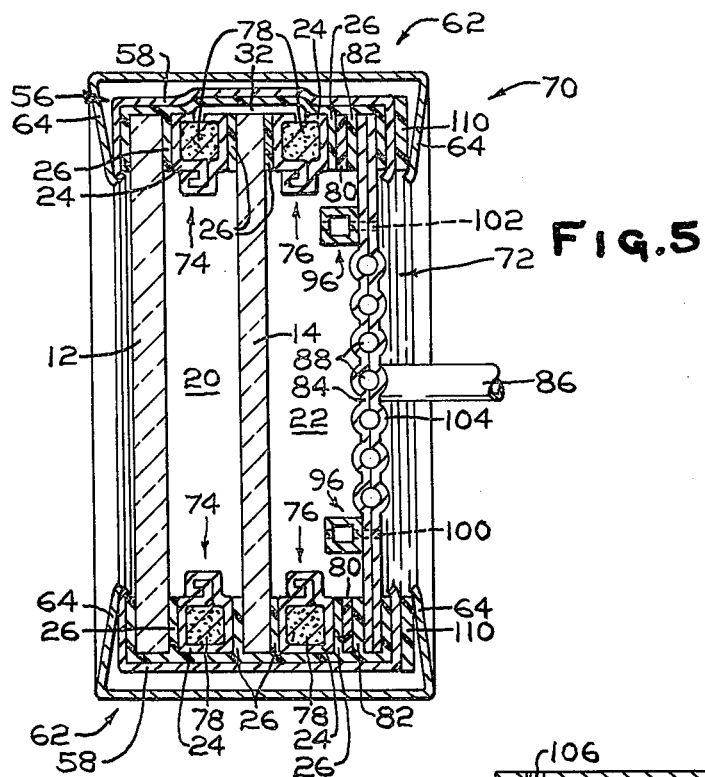
Fig. 5
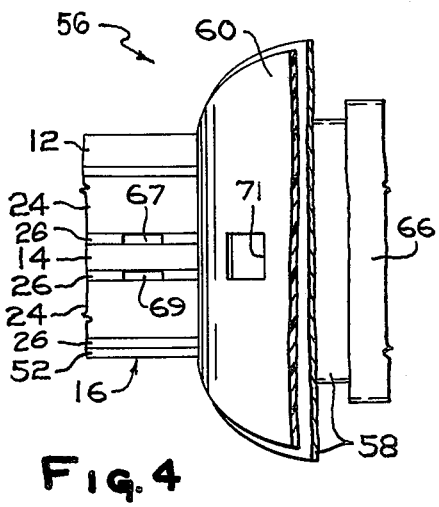
Fig. 4
Fig. 6
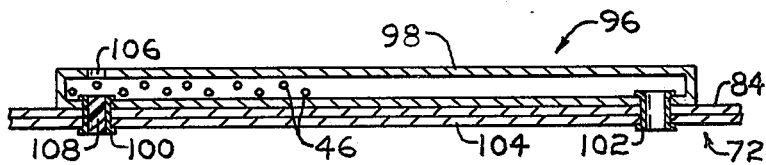
Fig. 8
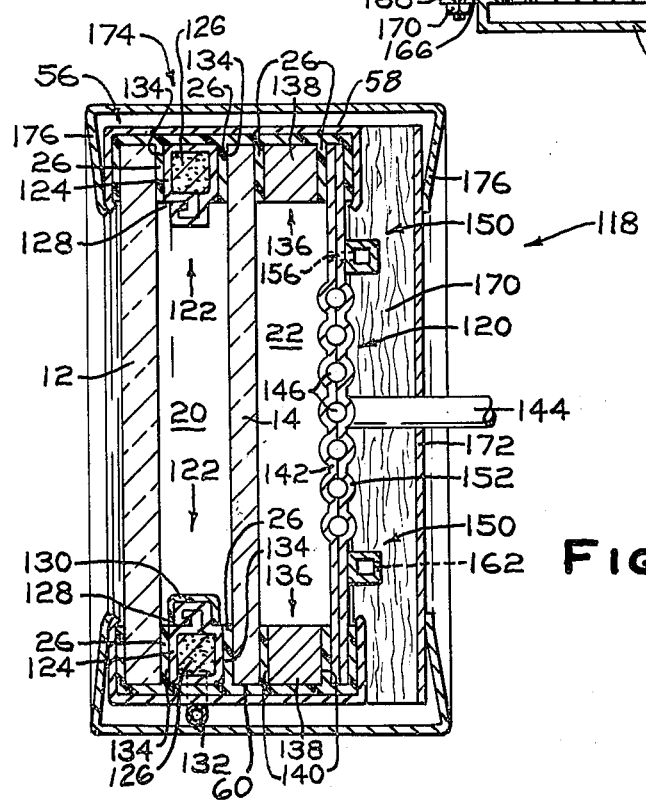
Fig. 7

3,999,536

SOLAR ENERGY ABSORBER PLATE HAVING A BREATHER TUBE

RELATED U.S. PATENT APPLICATION

The solar heat collector having a breather tube taught in commonly assigned U.S. patent application Ser. No. 550,680 filed on Feb. 18, 1975 in the names of Renato J. Mazzoni and Lester F. Schutrum and entitled "Solar Heat Collector Having A Breather Tube" is related to this application. The method of removing volatiles in a moisture-impervious adhesive taught in commonly assigned U.S. patent application Ser. No. 550,679 filed on Feb. 18, 1975 in the names of George H. Bowser, Renato J. Mazzoni and Lester F. Schutrum and entitled "Method Of Fabricating A Solar Heat Collector" may be practiced with the invention. The teachings of the above-identified applications are hereby incorporated by reference.

BACKGROUND OF THE INVENTION

1. Field of the Invention

This invention relates to a solar heat collector having a breather tube mounting the absorber plate.

2. Discussion of the Technical Problems

The advantages of using solar heat collectors to collect solar energy for subsequent use have been recognized in the prior art. For example, in U.S. Pat. No. 2,462,952, there is taught the use of solar energy to activate a desiccant material used to absorb moisture from an enclosure. In general, a receptacle is filled with desiccant material and mounted on the upper portion of the enclosure. Communication is provided (1) between the interior of the enclosure and the desiccant material and (2) between the atmosphere and the desiccant material. The outer surface of the receptacle and the enclosure are heated by solar energy to heat the desiccant material and expand the air in the enclosure. The expanded air moves from the enclosure through the desiccant material and into the atmosphere to dehumidify the enclosure. The heating of the desiccant material by solar energy and the movement of air therethrough activates the desiccant material.

The solar heat collector of the above-identified patent has drawbacks. More particularly, a portion of the absorbed solar energy is lost due to conduction and/or convection heat losses to the atmosphere.

In U.S. patent application Ser. No. 550,680 filed on Feb. 18, 1975 in commonly assigned the names of Renato J. Mazzoni and Lester F. Schutrum, there is taught of a solar heat collector that reduces conduction and/or convection heat losses to the atmosphere by maintaining a cover plate in spaced relation to an absorber by a spacer assembly to provide an airspace or compartment therebetween. The spacer assembly includes a breather tube for equalizing the air pressure in the compartment to the ambient air pressure while preventing moisture from moving into the compartment. A further advantage of providing a breather tube in the spacer assembly is that desiccant material in the spacer assembly is regenerated. The desiccant material is used to remove moisture trapped in the compartment during fabrication of the solar collector and remove moisture from the air passing through the desiccant to equalize the air pressure in the compartment to the ambient air pressure.

It would be advantageous if a solar heat collector was available that has all the advantages of the solar heat collector of the above-mentioned application and is economical to construct.

SUMMARY OF THE INVENTION

This invention relates to an improved solar heat collector of the type having at least one cover, a solar energy absorber and a spacer assembly for maintaining the at least one cover plate and absorber in spaced relation to provide an airspace therebetween and for preventing the ingress of moisture into the airspace. The improvement includes facilities mounting the absorber for containing desiccant material. Facilities mounting the absorber provide communication (1) between the airspace and the desiccant material and (2) between the atmosphere and the desiccant material.

In one embodiment, the containing facilities include a cavity formed in the absorber. A first hole extends from the cavity to the inner surface of the absorber and a second hole spaced from the first hole extends from the cavity to the outer surface of the absorber.

This invention also relates to a solar heat collector for regenerating desiccant material used to absorb moisture from the heat collector wherein the heat collector is of the type having plate facilities for passing solar radiation, a solar radiation absorber and facilities for mounting the cover plate and absorber in spaced relation to provide an airspace therebetween. The solar heat collector includes facilities mounting the absorber for containing a desiccant material. A first facilities provides communication between the airspace and the absorber to remove moisture therefrom. A second facilities provides communication between the atmosphere and the cavity. The heating of the absorber by solar radiation heats the desiccant material driving moisture therefrom and expands the air in the airspace to move the air through the containing facilities to remove moisture thereby regenerating the desiccant material.

BRIEF DESCRIPTION OF THE DRAWING

FIG. 4 is a fragmented side view of a solar heat collector showing an alternate embodiment for providing communication between the airspaces;

FIG. 5 is a cross-sectional side view of an alternate embodiment of a solar heat collector having an alternate embodiment of the invention;

FIG. 6 is a cross-sectional side view of an absorber tube incorporating features of the invention;

FIG. 7 is a cross-sectional view of a solar heat collector illustrating another embodiment of the invention; and FIG. 8 is a side view of a breather tube incorporating still another embodiment of the invention.

DESCRIPTION OF THE INVENTION

This invention relates to a solar heat collector having a breather tube provided on the absorber plate to (1) equalize the air pressure within the solar heat collector to ambient air pressure and (2) an efficient system for regenerating desiccant material used to absorb moisture in the collector. Although the invention will be practiced on different types of solar heat collectors, it will become readily apparent to those skilled in the art that the invention is not limited thereto. In the following discussion, like numerals refer to like elements.

Figure 1:
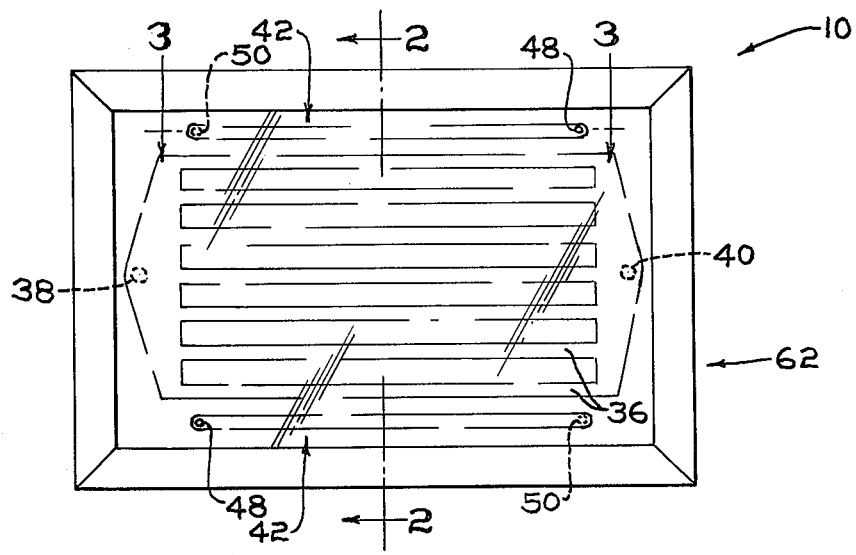
FIG. 1 is a frontal view of a solar heat collector constructed in accordance to the teachings of the invention.
Figure 2:
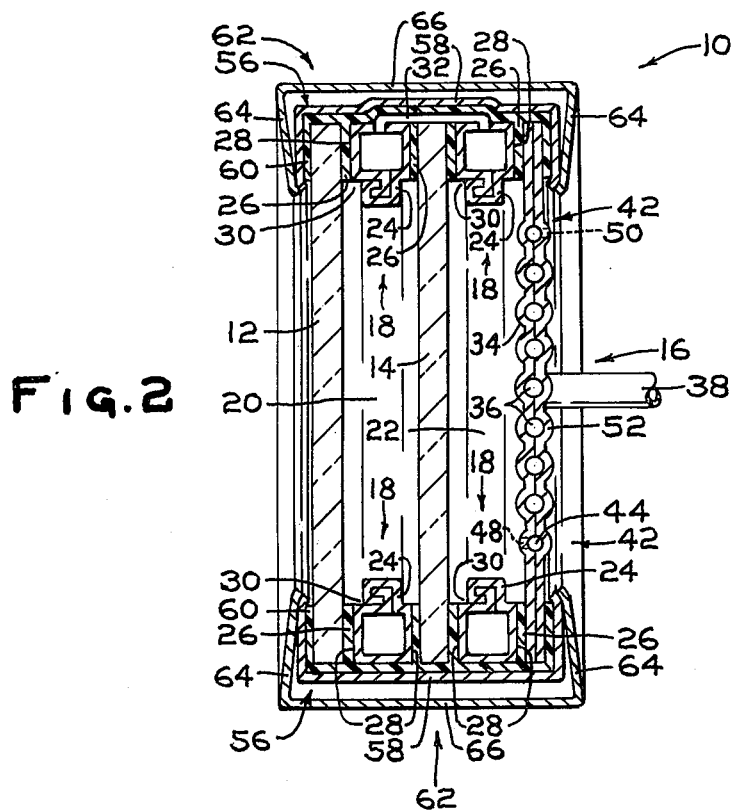
FIG. 2 is a fragmented view taken along lines 2—2 of FIG. 1.

Referring to FIGS. 1 and 2, there is shown a solar heat collector 10 having an outer cover plate 12 and an intermediate cover plate 14 and a solar energy and infrared absorber plate 16 incorporating features of the invention held in spaced relation by spacer assemblies 18. One of the spacer assemblies maintains the cover plates 12 an 14 in spaced relation to provide an airspace or compartment 20 therebetween. The other spacer assembly maintains the intermediate cover plate 14 and absorber 16 in spaced relation to provide an airspace or compartment 22 therebetween. The spacer assemblies also prevent moisture from moving into the airspace in a manner to be discussed below.

The outer and intermediate cover plates 12 and 14, respectively, are selected to pass solar radiation to the absorber plate 16 and to minimize convection, conduction and/or radiation heat losses of the solar collector. Normally the cover plates are made of glass which may be thermally or chemically tempered. Further, if desired, one or both of the glass plates may be selectively coated as taught in U.S. patent application Ser. No. 450,702 filed on Mar. 13, 1974, in the name of Frank H. Gillery and entitled "Solar Heat Collector". As will become apparent, the invention is not limited to the number of cover plates employed.

With reference to FIG. 2 each of the spacer assemblies 18, in general, include a spacer frame 24 having a layer 26 of moisture-impervious adhesive on opposed surfaces 28 of the spacer frame to provide a primary moisture-impervious seal.

The spacer frame 24 is preferably made of hollow, tubular sections having passageways 30 therein to provide communication between the interior of the spacer frame and the airspaces. The hollow, tubular sections may be of the type disclosed in U.S. Pat. No. 2,684,266. A tube 32 has its ends mounted in the spacer frames 24 to provide communication between the airspaces 20 and 22 to remove moisture in the airspace 20 and equalize the pressure in the airspace 20 in a manner to be discussed below. As can be appreciated, the spacer frame may be made of solid sections of any material, e.g., wood, metal or plastic.

The moisture-impervious adhesive used may be any of the types used in the solar collector art. "Moisture-impervious adhesive" as the term is used is adhesive that prevents moisture from moving into the airspaces while adhesively bonding the spacer frames, cover plates and absorber plates together. The moisture-impervious adhesive may be of the type disclosed in U.S. patent application Ser. No. 550,679 filed on Feb. 18, 1975 in the names of George H. Bowser, Renato J. Mazzoni and Lester F. Schutrum and entitled "Method Of Fabricating A Solar Heat Collector". The teachings of the above-identified application are hereby incorporated by reference.

The discussion will now directed to the absorber plate 16 incorporating features of the invention. In general, the absorber plate 16 is made of a heat conductive material such as aluminum, steel or copper. Surface 34 of the absorber plate facing the sun is normally treated so as to provide maximum efficiency in absorbing solar energy and infrared energy for subsequent use. For example, but not limiting to the invention, the absorber plate 16 heats a heat absorbing medium moving through conduits 36 provided in the absorber plate 16. The heat absorbing medium, for example, water or a mixture of water and ethylene glycol, is moved into the inlet pipe 38 through the conduits 36 and out of the conduits by way of outlet pipe 40.

Figure 3:
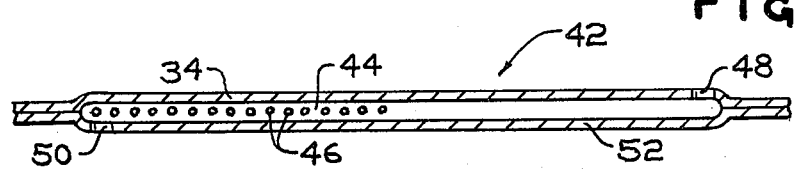
FIG. 3 is a view taken along lines 3—3 of FIG. 1 and having portions removed for purposes of clarity.

With reference to FIGS. 1 and 2, the absorber plate 16 is provided with a pair of breather tubes 42 formed in the absorber plate 16 in any conventional manner. With reference also to FIG. 3, each of the breather tubes 42 includes a cavity 44 filled with desiccant material 46 such as molecular sieve or silica gel. A hole 48 is provided in surface 34 of the absorber plate to provide communication between the airspace 22 and the desiccant material 46 in the cavity 44. A second hole 50 spaced from the hole 48 is provided in opposed surface 52 of the absorber plate to provide communication between the ambient air and the desiccant material 46 in the cavity 44.

The size of the holes communicating with the atmosphere is a function of the volume of desiccant material in the cavity and the length of the column of desiccant material to control the air flow through the cavity. In this manner essentially all the moisture is removed from the air before entering the airspace. As the size of the hole increases, the volume and column length of the desiccant material increases. In general holes having a diameter of 0.020 inch (0.0508 centimeter) are used with 37 cubic inches 606 milliliters of desiccant material having a column length of about 6 feet (1.8 meters).

The size of the hole 48 providing communication to the airspace and the inside diameter of the tube 32 providing communication between the airspaces 20 and 22 is not limiting to the invention. This is because the equalization of air pressure in the airspace to the ambient air pressure is gradual. Therefore, there is essentially no pressure drop between the hole 50 and the hole 48 and/or tube 30 that pulls air into the collector.

The desiccant material 46 in the cavity 44 (1) absorbs moisture trapped in the airspaces 20 and 22 during fabrication of the solar heat collector and (2) equalizes the air pressure in the airspaces 20 and 22 to the ambient air pressure.

During use of the solar heat collector, the absorber plate is heated by solar energy and infrared energy. As the absorber is heated (1) air in the airspaces is heated and expands and (2) the desiccant material 46 in the cavities 44 is heated driving out moisture. The heated air moves out of the airspace 20 into the airspace 22 by way of tube 32. The air in the airspace 22 moves out by way of the hole 48, cavity 44 and hole 50 to equalize the air pressure in the airspaces to the ambient air pressure. Moisture driven out of the heated desiccant material is removed from the cavities by the heated air passing therethrough to regenerate the desiccant material.

In the evening, the air pressure in the airspaces is less than the ambient air pressure and the ambient air moves through the hole 50, cavity 44 and hole 48 into the airspace 22. The air in the airspace 22 thereafter moves into the airspace 20 by way of tube 32. Any moisture in the ambient air is removed as it passes through the desiccant material in the cavities. The breather tube prevents pressure build-up in the airspaces while permitting air free of moisture to move into the airspaces.

As can be appreciated by those skilled in the art, preventing moisture from moving into the solar heat collector provides a more efficient collector. This is because (1) moisture in the airspaces 20 and 22 condense on the cover plates reducing the amount of solar energy impinging on the absorber plate 14; (2) moisture condensing on the absorber reduces the efficiency of the absorber by reducing the absorptivity coefficient and increasing the emissivity coefficient and (3) moisture in the airspace is converted to vapor and maintained as vapor by solar energy thereby reducing the amount of solar energy available for subsequent use.

Moisture trapped in the airspaces 20 and 22 during fabrication of the solar heat collector is removed by the desiccant material 46 in the cavity 44 of the breather tube 42.

Providing the solar absorber with a breather tube has a further advantage; namely, a more efficient system for regenerating the desiccant material. This is because the solar energy is directly incident on the absorber containing the desiccant material.

The absorber plate 16 shown in FIGS. 1 and 2 has a breather tube mounted along each side of the conduits 36. However, the invention is not limited thereto. One, two, three or more breather tubes may be used. Further, the breather tubes may be located between the conduits or at any other position.

Although not limiting to the invention but recommended to provide an additional moisture-impervious seal, there is provided a composite strip 56. The composite strip 56 includes a bendable-formable tape 58 made of a moisture-impervious material, e.g., metal, such as aluminum having a layer 60 of moisture-impervious adhesive thereon. The 56 is preferably provided around the peripheral edge portions of the spacers, cover plates and absorbers and over the tube 32, and (2) the marginal edge portions of the outer cover plate 12 and absorber 16 as shown in FIG. 2. The composite strip 56 provides a secondary moisture-impervious seal.

A channel member 62 of essentially U-shaped cross-section preferably extends completely around the perimeter of the solar collector to protect the edges of the cover plates and provide structural stability to the collector by urging the cover plates and absorber toward each other about the spacer assemblies. The channel member 62 is made of a metal, e.g., stainless steel, and has legs 64 and center portion 66 forming an angle slightly less than 90°. The legs 64 are held apart to permit the insertion of the collector and thereafter the legs are released and spring back to contact the marginal edges of the outer cover plates and the absorber. The channel member generally includes several sections of channeling that are joined or abutted together at their ends.

As can now be appreciated, the invention is not limited to any particular expedience for interconnecting the airspaces 20 and 22.

Referring to FIG. 4, there is shown another expedience that may be used to interconnect the airspaces 20 and 22. A passageway 67 and 69 is provided through the adhesive 26 on each side of the intermediate plate 14. The composite strip 56 has a portion 71 of the adhesive 60 removed from the tape 58. Air moves between the passageways 66 and 68 into and out of the airspaces 20 and 22 while maintaining a moisture-impervious seal. In the alternative the layer 26 of the adhesive may be eliminated and the composite strip 56 used to provide the moisture-impervious seal.

Referring to FIG. 5, there is shown a cross-sectional view of a solar heat collector 70 of a different construction and having an absorber plate 72 incorporating an alternate embodiment of the invention. Solar collector 70 includes the cover plates 12 and 14 and absorber 72 held in spaced relation by spacer assemblies 74 and 76 to provide the airspaces 20 and 22, respectively.

Spacer assembly 74 is similar to spacer assembly 18 of FIG. 2 with the differences now to be discussed. Desiccant material 78 is provided in the spacer frame 24 to absorb moisture trapped in the airspace 20 during fabrication of the solar heat collector.

The spacer assembly 76 is of the type taught in U.S. patent application Ser. No. 550,681 filed on Feb. 18, 1975 in the name of Pandit G. Patil and entitled "Solar Heat Collector Having Minimum Edge Heat Loss". In general, the spacer assembly 76 includes (1) a spacer frame 24 having the desiccant material 78 therein, (2) the layers 26 of moisture-impervious adhesive, (3) a layer of thermal insulating material 80, and (4) an additional layer 82 of the moisture-impervious adhesive.

One side of the layer 80 of thermal insulating material is adhesively bonded to the marginal edge portions of the absorber plate 72 by the layer 82 of the moisture-impervious adhesive. The other side of the layer of thermal-insulating material 80 is adhesively bonded to the adjacent side of the spacer frame 24 by the layer 26 of the moisture-impervious adhesive.

The layer of thermal-insulating material which may be cork or asbestos reduces edge heat loss in a manner taught in the above-identified application, filed in the name of Pandit G. Patil.

Communication between the airspace 20 and 22 is provided by the tube 32 was previously discussed.

The absorber plate 72 has a surface 84 treated to heat a heat absorbing medium moving into inlet pipe 86, conduits 88 and outlet pipe (not shown) similar to the inlet pipe 28, conduits 26 and outlet pipe 30, respectively, of FIGS. 1 and 2.

A pair of breather tubes 96 incorporating features of the invention are provided on the absorber surface 84 in a manner to be discussed below.

Referring to FIGS. 5 and 6, each of the breather tubes 96 include a closed tubular container 98 having the desiccant material 46 therein. The tubular container 98 is mounted on the absorber surface 84 in any conventional manner, e.g., by pop rivots 100 and 102 which extend through opposed surfaces of the absorber plate as shown in FIG. 5. Communication between the airspace 22 and the desiccant material 46 in the tubular container 98 is provided by hole 106. The pop rivot adjacent the hole 106, e.g., pop rivot 100, in FIG. 6 is sealed in any conventional manner as by a layer 108 of the moisture-impervious adhesive or solder. In this manner, movement of air into and out of the airspaces is through the desiccant material 46 as was previously discussed.

Referring specifically to FIG. 5, the composite strip 56 is provided about the cover plates 12 and 14 and the absorber 72 as was previously discussed for the solar heat collector 10 shown in FIG. 2 to provide a secondary moisture-impervious seal. An additional layer 110 of thermal insulating material is adhesively bonded to the tape 58 of the composite strip 56 adjacent the surface 104 of the absorber 72. The channel member 62 has its legs 64 engaging the marginal edge portions of the outer cover plate 12 and the layer 110 of the thermal insulating material as shown in FIG. 5. The use of the layer 110 of the thermal insulating material further reduces edge heat losses as taught in the above-mentioned U.S. Patent Application filed in the name of Pandit G. Pantil.

Referring to FIG. 7, there is shown still another embodiment of a solar heat collector using an alternate embodiment of a breather tube incorporating features of the invention.

Solar heat collector 118 includes the cover plate 12 and 14 and absorber 120 incorporating features of the invention. The cover plates 12 and 14 are held in spaced relation by spacer assembly 122 to provide the airspace 20 therebetween.

The spacer assembly 122 is of the type disclosed in U.S. patent application Ser. No. 550,680 filed on Feb. 18, 1975 in the names of Renato J. Mazzoni and Lester F. Schutrum and entitled "Solar Heat Collector Having A Breather Tube". In general, the spacer assembly 122 includes a spacer frame 124 similar to the spacer frame 24 of FIG. 2 with the differences now to be discussed. The spacer frame 124 has desiccant material 126 therein. A continuous section of the spacer frame 124 has passageways 128 sealed in any conventional manner as by a layer 130 of paint. The remaining passageways are open to provide communication between the desiccant material 126 and the airspace 20 to remove moisture therein.

A capillary tube 132 is provided on the outer peripheral surface of the spacer frame opposite to the sealed passageways. Spacer frame 124 provides for equalization of the air pressure in the airspace 20 while preventing moisture from moving into the airspaces in a manner discussed in the above-mentioned U.S. patent application.

The layer 26 of the moisture-impervious adhesive is provided on opposed surfaces 134 of the spacer frame, to provide the primary moisture-impervious seal.

Spacer assembly 136 maintains the absorber 120 and the intermediate cover plate 14 in spaced relation to provide the airspace 22 therebetween. The spacer assembly 136 includes a solid spacer frame 138 having the layer 26 of moisture-impervious adhesive on opposed surfaces 140 of the spacer frame. The layer 26 of the adhesive provides the primary moisture-impervious seal for the airspace 22. As can be appreciated, the spacer frame 138 can be made from hollow, spacer section similar to spacer frame 24 shown in FIG. 2.

The absorber 120 has the surface 142 treated to heat a heat absorbing medium moving through the inlet pipe 144, conduits 146 and outlet pipe (not shown) similar to the inlet pipe 38, conduits 36 and outlet pipe 40, respectively, of the collector 10 shown in FIGS. 1 and 2.

Referring now to FIGS. 7 and 8, a pair of breather tubes 150 (one shown in FIG. 8) incorporating features of the invention are mounted about the conduit on the outer absorber surface 152 in a manner to be discussed below.

Each of the breather tubes includes a closed container 154 having the desiccant material 46 therein. Communication between the desiccant material and the airspace 22 is provided by a tube 156 passing through hole 158 formed in the absorber plate. A layer of moisture-impervious adhesive (not shown) may be provided about the tube 156 to prevent moisture from moving into the airspace through hole 158 in the absorber. As can be appreciated, in the instance when the tube 156 is not used the hole 158 in the absorber is aligned with a corresponding hole in the breather tube 150.

A hole 162 is provided on the opposed surface of the container and spaced from the tube 156 to provide communication between the ambient air and the desiccant material in the tube.

The breather tube 150 may be secured to the outer absorber surface with pop pivots or by a pair of screws 164. The screws 164 pass through the plate and are hermetically sealed therein. The screws pass through hole 166 formed in flanges 168 of the breather tube 150. Nuts 170 secure the tube in position.

The advantage of providing a removable breather tube is that the desiccant material, if desired, may easily be replaced by removing the tube 150 and substitute a new one therefore containing desiccant material.

Referring to FIG. 7, the composite tape 56 is provided about the collector in a similar manner as the tape was applied to the collector 10 of FIG. 2 to provide a secondary moisture-impervious seal. In this instance, however, the breather tube 132 of spacer assembly 122 extends beyond the composite strip.

Mounted on the back of the solar collector is a layer 170 of thermal-insulating material, e.g., fiber glass, to reduce convection heat losses from the absorber plate. A sheet 172 made of metal or plastic is provided against the thermal-insulating material to protect the material from the environment. The inlet pipe 144 and outlet pipe (not shown) extend beyond the protective sheet 172.

A channel member 174 similar to the channel member 62 shown in FIG. 2 has opposed legs 176 engaging the outer marginal edge portions of the outer cover plate and of the protective sheet.

As can be appreciated, the invention is not limited to the embodiments discussed above. More particularly, the absorber plate of FIGS. 2, 5 and 7 may be interchanged as may any of the spacer assemblies.

DETAILED DESCRIPTION OF THE INVENTION

The invention will be described to construct a solar heat collector of the type shown in FIGS. 1 and 2 in accordance to the teachings of the invention.

A two ply sheet of aluminum approximately 7 feet (2.1 meters) × 3 feet (0.9 meter) is provided in any conventional manner, with a conduit 36 for passing a mixture of water and ethylene glycol at a flow rate of 0.3 gallons per minute (0.02 liters per second) at atmosphere pressure. A pair of breather tubes 42 is provided one on each side of the conduit 36.

With reference to FIG. 3, each of the breather tubes 42 includes a cavity 44 having a volume of about 37 cubic inches (606 millimeters) and a length of about 6 feet (1.8 meters). A hole 50 having a diameter of about 0.020 inch (0.05 centimeter) extends from the cavity 44 through the surface 52 of the absorber to provide communication between the cavity 44 and the atmosphere. A second hole 48 having a diameter of about one-fourth inch (0.60 centimeter) spaced about 6 feet (1.8 meters) from the hole 50 extends from the cavity 44 through the surface 34 to provide communication between the airspace 22 and the cavity 44.

An absorber of the type discussed above may be fabricated by Olin Brass Corporation of East Alton, Ill.

Silica gel is moved into the cavity 44 by way of hole 48 and thereafter the hole is plugged with a porous material, e.g., a felt pad or steel wool to prevent the desiccant from falling out of the cavity.

An inlet and outlet pipe 38 and 40, respectively, are connected to the conduits as shown in FIGS. 1 and 2 for moving the heating medium therethrough.

The surface 34 of the absorber is provided with a layer of black paint such as the type sold by PPG Industries, Inc., under the trademark DURACRON super 600L/G and fired at a temperature of about 350°F. (160°C.) for 15 to 20 minutes to provide the surface 42 of the absorber with a non-selective surface having an absorptivity coefficient for solar energy in a wavelength of 0.3 to 2.1 microns and an emissivity coefficient for infrared radiation in a wavelength of 2 to 20 microns of about 0.95.

With reference to FIG. 2, a pair of commercial soda-limeglass sheets 12 and 14 having dimensions of 7 feet (2.1 meters) × 3 feet (0,9 meter) × ⅛ inch (0.32 centimeter) thick are provided. The glass sheets are preferably tempered to reduce the probability of breakage during use, for example, from stones or hail. The glass sheets are cleaned in any conventional manner to remove any foreign particles that may inhibit the passage of solar energy through the glass sheets toward the absorber plate.

A pair of spacer frames 24 are constructed from four (4) sections of a lock seam spacer of the type disclosed in U.S. Pat. No. 2,684,266. The ends of the sections are mitered and joined together to provide a pair of spacer frames each having dimensions of 7 feet (2.1 meters) × 3 feet (0.9 meter) × ½ inch (1.25 centimeters).

A layer 26 of moisture-impervious adhesive of the type disclosed in the above-mentioned U.S. patent application filed in the names of George H. Bowser, Renato J. Mazzoni and Lester F. Schutrum having a thickness of about 15 to 20 mils (0.03 to 0.05 centimeter) and a width of less than five-sixteenths inch (0.8 centimeter) is extruded onto opposed outer surfaces 28 of the spacer frame in any conventional manner. Thereafter the spacer frame and adhesive is heated to remove essentially all the volatiles in the adhesive as taught in the aboveidentified U.S. patent application.

The absorber 16 is positioned on a rigid surface with the surface 34 facing upward. A spacer frame and intermediate glass sheet 14 is positioned on top of the absorber with the marginal edges aligned. Thereafter, in a like manner, the second spacer frame is positioned on the intermediate glass sheet followed by the outer glass sheet 12.

The adhesive between the spacer frames, glass sheets and the absorber is flowed under a pressure of between about 2 to 10 pounds per square inch (0.14 – 0.7 kilograms per square centimeter) in any conventional manner to form a primary moisture-resistant seal.

A tube 32 having an inside diameter of 0.020 inch (0.05 centimeter) interconnects the interior of the spacer frames 24.

Thereafter a composite strip 56 is provided. The strip includes a 1¾ inch (4.4 centimeters) wide aluminum tape 58 having a thickness of 0.010 inch (0.03 centimeter) and a layer of mositure-resistant adhesive 60 provided on a surface in any conventional manner. The adhesive 60 is similar to the adhesive 26. The strip is applied in any conventional manner to (1) the peripheral edges of the absorber, spacer frames and glass sheets and (2) bent over the marginal edge portions of the outer glass sheet and the absorber to provide a secondary moisture-impervious seal. Preferably the strip extends completely around the perimeter of the collector with the ends overlapping.

A channel member 62 of essentially U-shaped cross-section is provided completely around the perimeter of the collector to protect the edges of the glass sheets and to provide structural stability to the collector by urging the glass sheets and absorber toward each other.

The discussion will now be directed to constructing a solar heat collector of the type shown in FIG. 5.

An absorber 72 is provided with a conduit 88. The conduit 88 is connected at one end to an inlet pipe 86 and the other end to an outlet pipe (not shown). A breather tube 96 is provided on each side of the conduit on absorber surface 84. Each of the breather tubes includes a rectangular shaped tube having a hole 106 about 0.020 inch (0.05 centimeter) diameter to provide communication between the airspace 22 and the interior of the tube. The tube has dimensions of about 6 feet (1.8 meters) and has interior cross-sectional dimensions of three-fourths inch ((1.9 centimeters). The tubes are secured on the absorber by pop rivots 100 and 102 having an inside diameter of about 0.020 inch (0.05 centimeter). The pop rivot 100 is filled with plug 108 of moisture-impervious material. The pop rivot 102 spaced about 6 feet (1.0 meters) from the hole 106 provides communication between the atmosphere and the interior of the tube. The tube 98 is filled with a silica gel 46 in any conventional manner. For example, one end of the tube may be removed to fill the tube with silica gel. Thereafter the end of the tube is hermetically sealed as by welding.

Surface 84 of the absorber and the outer surface of the breather tubes facing the sun are coated with black paint such as the type sold by PPG Industries, Inc., under the trademark DURACRON super 600L/G and fired at a temperature of 350° F. (177° C.) for 15 to 20 minutes.

The outer and intermediate glass plates 12 and 14 are prepared as previously discussed. The spacer frames 24 are prepared as previously discussed and filled with silica gel 78. The layer 26 of moisture-impervious adhesive is provided on opposed surfaces of the spacer frame and heated as previously discussed.

The absorber 72 is positioned on a rigid surface with the surface 84 facing upward. A layer 82 of volatile free, moisture-impervious adhesive of the type previously discussed having a thickness of about 0.015 to 0.020 inch (0.03 to 0.05 centimeter) and a width of less than about five-sixteenths inch (0.8 centimeter) is provided around the marginal edge portions of the absorber. A layer 80 of cork one-eighth inch (0.32 centimeter) thick and five-sixteenths inch (0.8 centimeter) wide is positioned on the layer of adhesive with marginal edges aligned. A spacer frame 24 having the moisture-impervious adhesive on opposed outer surfaces is positioned on the cork and the intermediate glass sheet 14 is positioned on top of the spacer frame with the marginal edges aligned. Thereafter, in a like manner, the other spacer frame is positioned on the intermediate glass sheet 14 followed by the outer glass sheet 16.

The tube 32 interconnects the interior of the spacer frames as previously discussed.

A layer 110 of cork similar to the layer 80 of cork is adhesively bonded in any conventional manner to the portions of the composite strip on the marginal edge portions of the outer surface of the absorber 72 as shown in FIG. 5. Thereafter, channel member 62 is provided around the perimeter of the collector having legs 64 engaging the marginal edge portions of the outer glass sheet and layer 110 of cork as shown in FIG. 5.

The discussion will now be directed to constructing a solar heat collector of the type shown in FIG. 7.

An absorber plate 120 is provided with a conduit 152 connected at one end to an inlet pipe 144 and the other end to an outlet pipe (not shown).

With reference to FIGS. 7 and 8, a breather tube 150 is detachably secured to outer absorber surface 152 about the conduit 152.

Each of the breather tubes includes a rectangular shaped tube having a length of 6 feet (1.8 meters) and a cross-section interior of three-fourths inch (1.9 centimeters) by three-fourths inch (1.9 centimeters). The tube is filled with a desiccant material 46 and has a hole 162 adjacent one end to provide communication between the ambient air and the desiccant material 46 in the breather tube. The hole 162 has a diameter of about 0.020 inch (0.05 centimeter).

Adjacent the other end of the breather tube is a tube 156 that extends through hole 158 in the absorber to provide communication between the airspace 22 and the desiccant material 46. A seal (not shown) of moisture-impervious adhesive is provided about the tube 156 and hole 158 to prevent moisture from moving into the airspace.

The tube is detachably secured to the absorber surface by a pair of screws extending through the absorber into holes 166 of tabs 168 extending from the breather tubes. A nut secures the breather tube in position. The nuts are preferably hermetically sealed in the absorber as by welding or epoxy.

The absorber surface is coated with a black paint as was disccused. A spacer frame 124 is constructed in accordance to the teachings of the above-mentioned U.S. patent application filed in the names of Renato J. Mazzoni and Lester F. Schutrum. In general, the spacer frame is constructed by mitering the ends of four sections of a lock seam spacer of the type disclosed in U.S. Pat. No. 2,684,266. A desiccant material 126, such as silica gel, is provided in the spacer sections and the sections joined together as by welding to provide a spacer frame having dimensions of 7 feet (2.1 meters) × 3 feet (0.9 meter) × one-half inch (1.25 centimeters). Two adjacent spacer sections have their passageways 128 coated with a paint 34 such as the type sold by PPG Industries, Inc., under the trademark DURACRON super 600L/G.

A capillary tube 132 having an outside diameter of 0.070 inch (0.18 centimeter) and an inside diameter of 0.020 inch (0.05 centimeter) is provided adjacent joined ends of the spacer sections having their passageways 128 sealed.

A spacer frame 138 made of teflon having the dimensions of spacer frame 124 is provided. A pair of commercial soda-lime-glass sheets 12 and 14 of the type previously discussed are provided.

The layer of moisture-impervious adhesive 26 is extruded onto opposed outer surfaces of the spacer frame and thereafter heated as previously discussed.

The absorber 120 is positioned on a rigid surface with the coated surface facing upward. The spacer frame 138 having the moisture-impervious adhesive on opposed outer surfaces is positioned on the absorber and the intermediate glass sheet 14 is positioned on top of the spacer frame with the marginal edges aligned. Thereafter, in a like manner the spacer frame 129 is positioned on the intermediate glass sheet 14 followed by the outer glass sheet 12.

The adhesive between the spacer frames, glass sheets 14 and 16, the absorber 120 is flowed under a pressure of between about 2 to 10 pounds per square inch (0.14 − 0.7 kilograms per square centimeter) in any conventional manner to form a primary moisture-resistant seal.

Thereafter a composite strip 56 is provided. The strip includes a 1¾ inch (4.4 centimeters) wide aluminum tape 59 having a thickness of 0.005 inch (0.015 centimeter). A layer of moisture-impervious adhesive 60 is provided on one surface in any conventional manner. The adhesive 60 is similar to the adhesive 26. The strip is applied, in any conventional manner, to (1) the peripheral edges of the absorber, glass sheets, teflon spacer frame and (2) bent over the marginal edge portions of the outer glass sheet and the absorber to provide a secondary moisture-impervious seal with the tube 132 extended beyond the tape 58.

Preferably the strip extends completely around the perimeter of the collector with the ends overlapping. To assure a good secondary moisture-impervious seal, moisture-impervious adhesive is provided around the tube 132 where it extends through the tape 58 of the composite strip. Thereafter the tube 132 is bent toward the tape 58 of the composite strip 50 and a covering is preferably provided over the tube 132 to prevent extremely large particles of dust from moving into the tube which could clog the tube. The covering may be a piece of aluminum or a felt pad inserted into the end of the tube.

Referring to FIG. 6, a layer 170 of fiber glass 7 feet (2.1 meters) × 3 feet (0.9 meter) and 3 inches (7.6 centimeters) thick is adhesively bonded to outer surface of the absorber. A sheet 172 of galvanized steel, 7 feet (2.1 meters) × 3 feet (0.9 meter) and 1/16 the inlet and outlet pipes is positioned over the fiber glass.

A U-shaped channel member 174 has its legs 176 contacting the marginal edges of the outer glass sheet and galvanized sheet to urge the collector and protective sheet together.

What is claimed is:

1. A solar heat collector of the type having a spacer assembly mounted between marginal edge portions of a cover plate capable of passing solar energy and a solar energy absorber to provide an airspace therebetween, a moisture-impervious seal mounting the spacer assembly, cover plate and absorber to prevent ingress of moisture into the airspace, the improvement comprising:
   the absorber comprising:
   containing means mounted on the absorber in spaced relation to the marginal edge portions of the absorber;
   desiccating material in said containing means;
   first means for providing communication between said desiccating material and the airspace; and
   second means thru said absorber for providing communication between the atmosphere and said desiccating material.

2. The improved solar heat collector as set forth in claim 1 wherein said containing means includes a cavity formed in the absorber and said first providing means includes a hole through the inner surface of the absorber to said cavity and said second providing means includes a hole spaced from the hole of said first providing means and through the outer surface of the absorber to said cavity.

3. The improved solar heat collector as set forth in claim 1 wherein said containing means includes a tubular container mounted on the inner surface of the absorber.

4. The improved solar heat collector as set forth in claim 1 wherein said containing means includes a tubular container mounted on the outer surface of the absorber.

5. The improved solar heat collector as set forth in claim 4 wherein said containing means further includes:
means for detachably securing said tubular container on the outer surface of the absorber.

6. The improved solar heat collector as set forth in claim 1 wherein the cover plate is a first cover plate, the airspace is a first airspace, the spacer assembly is a first spacer assembly, further including:
a second cover plate capable of passing solar energy; and
a second spacer assembly for maintaining the second cover plate in spaced relation to the first cover plate to provide a second airspace therebetween; and
the moisture-impervious seal mounting the second spacer assembly and first and second cover plates to prevent moisture from moving into the second airspace.

7. The improved solar heat collector as set forth in claim 6 further including means for providing fluid communication between the first and second airspaces.

8. The improved solar heat collector as set forth in claim 7 further including means mounting the absorber for moving a heat absorbing medium therethrough.

9. The improved solar heat collector as set forth in claim 8 wherein said containing means includes:
a cavity formed in the absorber on each side of the moving means and said first providing means includes a first hole through the inner surface of the absorber to said cavity and said second providing means includes a second hole spaced from the first hole through the outer absorber surface to said cavity.

10. The improved solar heat collector as set forth in claim 8 wherein said containing means includes a tubular container mounted on the inner surface of the absorber on each side of the moving means.

11. The improved solar heat collector as set forth in claim 8 wherein said containing means includes a tubular container mounted in the outer absorber surface on each side of the moving means.

12. The improved solar heat collector as set forth in claim 7 wherein the moisture-impervious seal includes:
a bendable-formable tape having a layer of moistureimpervious adhesive thereon, said adhesive mounted on at least the peripheral edges of the second cover plate and absorber; and further including
means for urging the second cover plate and absorber toward each other.

13. The improved solar heat collector as set forth in claim 7 wherein at least one of the spacer assemblies includes desiccant material for removing moisture in its respective airspace.

14. The improved solar heat collector as set forth in claim 6 wherein the second spacer assembly includes:
a spacer frame;
means for absorbing moisture in the second airspace; and
means for permitting the ingress of air from the second airspace when the air pressure in the second airspace is greater than the ambient air pressure and for the ingress of moisture free air into the second airspace when the pressure in the second airspace is less than the ambient air pressure.

15. The improved solar heat collector as set forth in claim 14 wherein the first spacer assembly includes a solid spacer frame.

16. The improved solar heat collector as set forth in claim 6 wherein a layer of moisture-impervious adhesive is on opposed surfaces of the first spacer assembly and further including:
a layer of thermal-insulating material adhesively bonded to the marginal edge portions of the absorber and adjacent surface of the first spacer assembly.

17. The improved solar heat collector as set forth in claim 6 further including:
a layer of thermal-insulating material on outer absorber surface;
a protective sheet; and
spring biasing means to urge the collector and protective sheet together against the layer of thermal-insulating material.

18. A solar heat collector for regenerating desiccant material used to absorb moisture in the heat collector wherein the heat collector is of the type having a spacer assembly mounted between marginal edge portions of a cover plate capable of passing solar radiation and a solar energy absorber to provide an airspace therebetween, a moisture-impervious seal mounting the spacer assembly, cover plate, and absorber to prevent ingress of moisture into the airspace, the improvement comprising:
the absorber comprising:
containing means mounted on the absorber in spaced relation to the marginal edge portions of the absorber;
desiccating material in said containing means;
first means for providing communication between the airspace and said desiccating material to remove moisture from the airspace; and
second means thru the absorber for providing communication between the atmosphere and said desiccating material wherein heating the absorber by solar energy heats said desiccating material driving moisture therefrom and expands air in the airspace to move the air through said first providing means said desiccating material and said second providing means to remove the moisture to regenerate said desiccating material.

19. The improved solar heat collector as set forth in claim 18 wherein said containing means includes a cavity formed in the absorber and said first providing means includes a hole through the inner surface of the absorber to said cavity and said second providing means includes a hole through the outer surface of the absorber to said cavity and spaced from the hole of said first providing means to provide communication between the cavity and the atmosphere.

20. The improved solar heat collector as set forth in claim 18 wherein said containing means includes a tubular container mounted on the inner surface of said absorber.

21. The improved solar heat collector as set forth in claim 18 wherein said containing means includes a tubular container mounted on the outer surface of said absorber.

22. The improved solar heat collector as set forth in claim 18 wherein the cover plate is a first cover plate and the spacer assembly is a first spacer assembly and further including a second cover plate and a second spacer assembly to maintain the first and second cover plates in spaced relation with an airspace therebetween and the moisture-impervious seal mounts the first and second cover plates and the second spacer assembly to prevent moisture from moving into the airspace between the cover plates.

23. The improved solar heat collector as set forth in claim 22 wherein the moisture-impervious seal includes:
 a bendable-formable tape having a layer of moisture-impervius adhesive thereon, said adhesive mounted on at least the peripheral edges of the cover plates and absorber; and further including
 means for urging the second cover plate and absorber toward each other.

* * * * *